May 21, 1963 J. H. BROWN 3,090,954

RADAR SYSTEM

Filed March 24, 1959 2 Sheets-Sheet 1

INVENTOR

JAMES H. BROWN

BY Raymond Wootton

ATTORNEY

FIG. 3
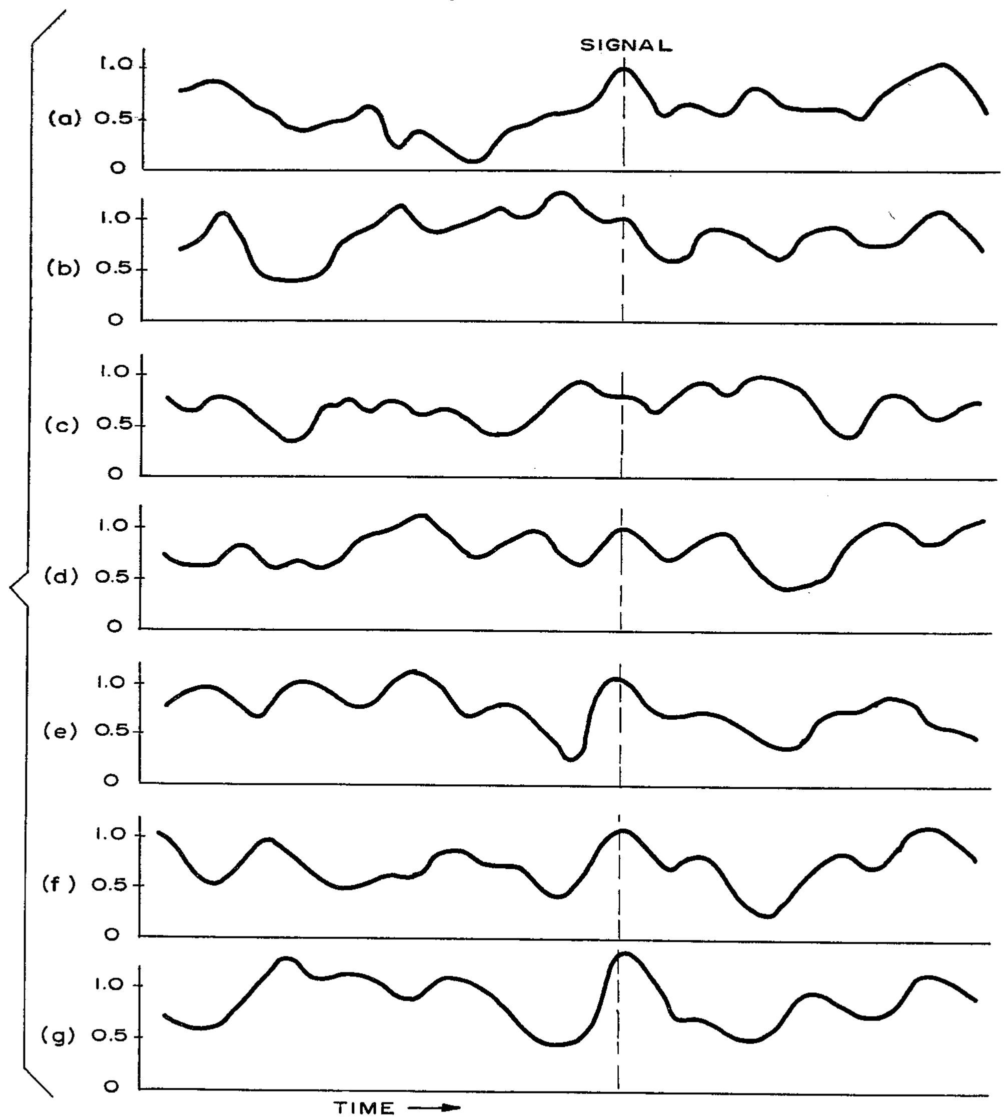
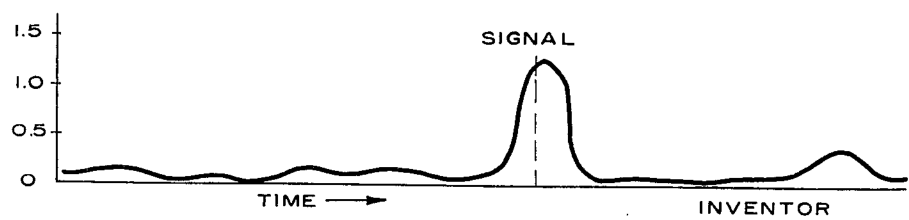
FIG. 4
INVENTOR
JAMES H. BROWN
BY Raymond W. Colton
ATTORNEY United States Patent Office 3,090,954
Patented May 21, 1963

3,090,954
RADAR SYSTEM

James H. Brown, Richardson, Tex., assignor, by mesne assignments, to Ling-Temco-Vought, Inc., Dallas, Tex., a corporation of Delaware Filed Mar. 24, 1959, Ser. No. 801,493
11 Claims. (Cl. 343—17.1)

This invention relates to a radar system incorporating equipment for transmitting spaced, pulsed signals, and an improved receiver arrangement for sensing the pulses reflected from a target so as to provide an exceptionally low noise to signal ratio.

During the reception of these echo pulses, intervening noise signals may enter the receiver, such noise signals ordinarily being attributable to sea clutter, jamming by an enemy, interference from other radars, or random interference. Where conventional receivers are employed, these interfering noise signals may be so great as to mask the desired echo signals reflected from the target or produce false indications of target echo signals.

In accordance with the present invention, great improvement over known radar systems is effected by the use of a multiplier circuit for multiplying the analogues of two voltages representing respectively, a received echo pulse and a previously received echo pulse which had been stored for the period between two pulses and then applied to the input of the multiplier circuit coincidently with the appliance at the multiplier circuit input of the newly received pulse. The multiplier circuit can be so arranged that only successive signals which are identical are multiplied. Since noise signals which are detected by the system are seldom, if ever, identical at the repetition rate of the pulses, they will not be multiplied to provide a usable output. Consequently, the pulse receiver contemplated by the present invention will operate to select only the desired pulse signals and discriminate against the noise signals to provide a high signal-to-noise ratio.

While many known radar systems transmit regularly recurrent pulses provided by a pulse reference frequency generator of constant repetition rate, other systems use a "jitter" control for varying the interval between successive transmitted pulses either randomly or in accordance with a desired pattern. The received target echo signals are then variably delayed to compensate for the "jitter" before being applied to the video circuits so that the received pulses are applied at the constant repetition rate of the pulse generator. Such a system of the latter type can discriminate against interfering radars using the same carrier frequency and pulse repetition rate and is immune to jamming since it avoids a recognizable regularly recurring signal. The storage and multiplier arrangement of this invention can also be used with a system of the type last described to eliminate noise signals of any description, to increase the signal-to-noise ratio and provide clear and well defined target echo pulses.

Among the objects of this invention are: to eliminate undesired noise signals from a receiving system to which pulsed signals are applied; to recirculate signals including desired recurrent pulses applied to a receiver and to multiply only the desired pulses to eliminate the undesired intervening noise signals and to improve the signal-to-noise ratio; to eliminate noise signals from the receiver of a radar system by the use of a multiplier and storage device so that only the identical desired pulses are multiplied to provide a usable output to be applied to a cathode ray tube or other indicator; to utilize the storage device of the invention as an accurate control for the pulse frequency generator; and to eliminate the noise signals and to improve the signal-to-noise ratio of a radar receiver in which the pulses are transmitted at a random rate.

A more complete understanding of the invention will follow a description of the accompanying drawings wherein:

FIG. 3 depicts a group of curves representing the successive target echo and noise signals picked up by the receiver before being applied to the multiplier and delay circuits of this invention; and FIG. 4 is a curve representing the resultant output signal produced from the successive signals of FIG. 3 as applied to the improved receiver of this invention.

Figure 1:
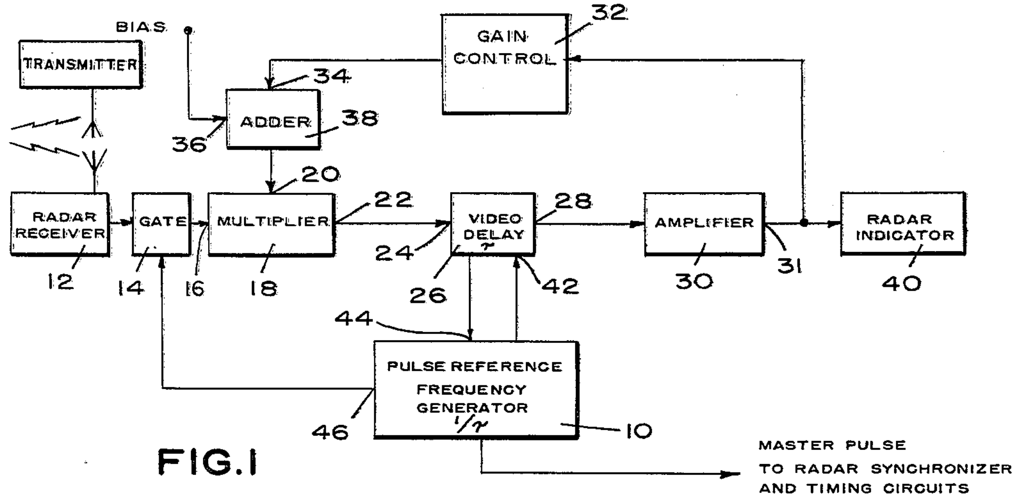
FIG. 1 is a block diagram of a circuit depicting the invention in a radar system wherein the pulses are radiated at a constant repetition rate.

In a conventional radar system a pulse generator 10 as depicted in FIG. 1, provides pulses at a predetermined repetition rate. These pulses modulate a high frequency carrier which is transmitted by the antenna. The pulses are further applied to the various timing circuits of the radar system in a manner well known in the art. In accordance with the present system, the pulse modulated carrier is received by the antenna of the radar system upon reflection from a target and passed to the receiver 12 where the signals are demodulated to provide video pulses which are applied to the gate 14. The gate is open to pass signals from the receiver to an input terminal 16 of the multiplier circuit 18 at all times except during operation of the generator 10, at which times the gate is closed by a pulse from the generator for the duration of the pulse.

The multiplier circuit 18 may include electron discharge devices, and in addition to the terminal 16 has an input terminal 20, to which terminals, signals to be multiplied are respectively applied. The output terminal 22 of the multiplier provides the product of the two input signals. A brief description of a circuit of this type may be found in a book entitled "Electron Tube Circuits" by Seely, published by McGraw-Hill 1950, pages 152, 153. The output from the multiplier is connected to the input terminals 24 of a video delay or storage device 26 which may be a delay line of the lumped circuit type, a section of a high frequency transmission line, or a compressional wave device such as a quartz rod, all of which are well known in the art.

The storage device 26 is of such character that signals applied to its input 24 appear at its output terminals 28 but they are delayed in time by an amount equal to the interval between pulses produced by the generator 10. The output terminals 28 of the delay device 26 are connected to the input of an amplifier 30 where the signals are amplified to compensate for losses in the delay device. The output terminals 31 of the amplifier are connected to the input terminals of a gain control circuit 32 which operates to maintain the output signals from the amplifier 30 at a desired amplitude level. A gain control circuit of the type contemplated here is described on page 95, volume 18, Vacuum Tube Amplifiers, Valley Waldman, Radiation Laboratory Series, published by McGraw-Hill Publishing Co.

The output from the gain control circuit 32 is applied to one terminal 34 of an adder 38 to the other terminal 36 of which, a bias voltage is connected. The sum of the signal voltage applied at the terminal 34 and the bias voltage applied at the terminal 36 occurs at the output of the adder, from which it is applied to the terminal 20 of the multiplier circuit and constitutes the value of the voltage to be multiplied by a voltage appearing at the other terminal 16 representing a signal from receiver 12. If the signal voltage at the terminal 20 is that of a pulse previously applied to the terminal 16 and which had passed through the multiplier and been delayed for one pulse period, it is now in coincidence with a newly arrived pulse from the receiver 12 so that multiplication of the voltages takes place, the product appearing at the terminal 24 of the delay device 26. This product then passes through the delay device and amplifier 30 and is reapplied to the terminal 20 of the multiplier where it is multiplied with a signal voltage of a newly arrived pulse, this operation being repeated until the value of the product at the output terminals of the amplifier 30 reaches a desirable value for display by the radar indicator 40 coupled to the output terminals of the amplifier 30. The recirculation and multiplication of the signals takes place on a continuous basis and the output from the amplifier 30 is continuously available for display on the indicator or cathode ray tube 40.

Since noise signals occur at random and inasmuch as the occurrent of appreciable noise signals having a repetition rate of the received pulses from target echo signals is highly remote, it is obvious that continuous multiplication of the signal voltages of the desired pulses in the manner described provide voltages far in excess of the multiplied noise signals which are relatively attenuated. In this regard, FIG. 3 depicts by the curves identified as *a, b, c, d, e, f* and *g* the noise and target echo signals appearing respectively, at the output of the receiver 12 after each of seven successive pulse outputs from the transmitter of the radar system. FIG. 4 shows the resultant output applied to the indicator 40 by utilizing the delay and multiplier circuits of this invention.

The following explanation is given as exemplary of the operation of the multiplier 18, delay circuit 26, amplifier 30, gain control 32, adder 38, and the bias input 36. As is well known in the art, the input target signals assume the form of a train of pulses with exact spacing between them. In our embodiment the delay circuit 28 delays the signal by a value equal to the time interval between pulses. Let us assume that the pulses are equal to one volt in amplitude. It is also well known that the noise signals are of an impulse nature and do not form a train of pulses with equal spacing equal to the delay interval of the delay line. In the present example, the gain control setting is such as to attenuate its output to 0.8 of its input. The gain control is used to reduce the gain of the signal that is delayed and fed back to input 20 of the multiplier 18. In order to compensate for the bias input, when it has been combined with the delayed signal 34, the gain control reduces the delayed signal by at least a proportionate amount. The bias is set to add 0.2 volt to the output of the gain control. Under these circumstances, the first 1-volt target signal will be multiplied by .2 volt since at that time there is no output from the gain control for this first signal. Accordingly, this product is 1×.2=.2 volt. This value at the output of the gain control becomes .2×.8=.16 volt. Taken together with the bias value of .2 volt, the output of the adder 38 will be .36 volt. The second signal having a value of 1 volt will be multiplied by this .36 volt to equal .36 volt, modified by the gain control factor of .8 to produce a value of .29 volt, to which is added the bias of .2 volt to produce .49 volt input at terminal 20 of the multiplier. The third signal of 1 volt, when multiplied by .49, becomes .49 volt and when modified by the gain control factor of .8 becomes .39 volt to which is added the bias of .2 volt to yield .59 volt. The fourth signal of 1 volt when multiplied by .59 volt becomes .59 volt, is modified by the gain control factor to .8 of its value which is .47 volt, and is added to the bias of .2 volt to become .67 volt. The fifth signal of 1 volt, when multiplied by .67, becomes .67 volt and after being changed to .8 of its value in the gain control becomes .52, which is added to the bias of .2 to become .72 volt. The sixth signal of 1 volt, which is multiplied by .72 to become .72, when operated upon by the gain control factor of .8 becomes .57 volt, which then is added to the bias of .2 to become .77 volt. The seventh signal of 1 volt is multiplied by .77 to become .77, modified by the gain control factor of .8 to become .62, and added to the bias to become .82 volt. The eight signal of 1 volt, when multiplied by .82, becomes .82, is modified by the gain control factor of .8 to become .65 volt, and is added to the bias to become .85 volt. The ninth signal of 1 volt when multiplied by .85 becomes .85, is further modified to .68 by the gain control factor of .8, and becomes .88 volt when added to the bias of .2 volt. The tenth signal of 1 volt when multiplied by .88 becomes .88, when modified by the gain control factor of .8 becomes .7, and when added to the bias of .2 volt becomes .9 volt.

Whereas the target signal pulses are uniform, the noise pulses are completely random in amplitude and time and consequently are decreased in amplitude when operated on in the same manner. For example, noise components of random pulses having values of .1, .9, .1, .3, .7, .2, .8, .4, and .5 volt when processed, are reduced to respective values of .02, .19, .35, .14, .04, .18, .14, .15, and .19 volt as compared to processed target signals of .2, .36, .49, .59, .67, .72, .77, .82, .85, .88 and .9 volt. Thus, whereas the target signals build up in amplitude during processing, the noise signals decrease or stay at very low values.

The delay device 26 may also be used as a synchronizing device for the pulse generator 10 to maintain the repetition rate of the pulses constant. As shown diagrammatically, an output pulse from generator 10 may be applied to an input terminal 42 of the delay device 26 and the delayed pulse from the output of the delay device reapplied to a terminal 44 of the generator as a synchronizing pulse to trigger it into operation. In this way the generator 10 may be accurately controlled to provide pulses for the timing and sweep circuit of the radar system. Since the pulse generated at 10 is instantaneously transmitted by the transmitter of the system, the receiver 12 is gated out at this time by the use of a conventional T—R box so that the generated pulse is not applied to the multiplier and succeeding video circuits to be circulated therethrough. Or as shown, a gate 14 controlled by a pulse from the generator terminal 46 may be used to prevent the generated pulses from being circulated through the multiplier and video circuits. Another gating device, not shown, may be used at the output terminals of the amplifier 30 to prevent the generated pulses from being applied to the following video circuits. Since the video circuits are gated out at the instant of generation of a timing pulse by the generator 10, the timing pulses applied to the input of the delay device 26 may be of large amplitude compared with the video signals circulating in the delay device, so that these video signals emerging from the delay device following a timing pulse, will be insufficient to trigger the generator 10 which may be adjusted to respond only to the amplitude of the timing pulses. Another way of preventing the video signals at the output of the delay device from triggering the pulse generator while utilizing the delay device as a synchronizer for the generator, is to apply the pulses from the generator 10 with a polarity opposite to that of the video signals circulating in the delay device and arrange for the generator to be triggered in response to the pulses of opposite polarity.

Figure 2:
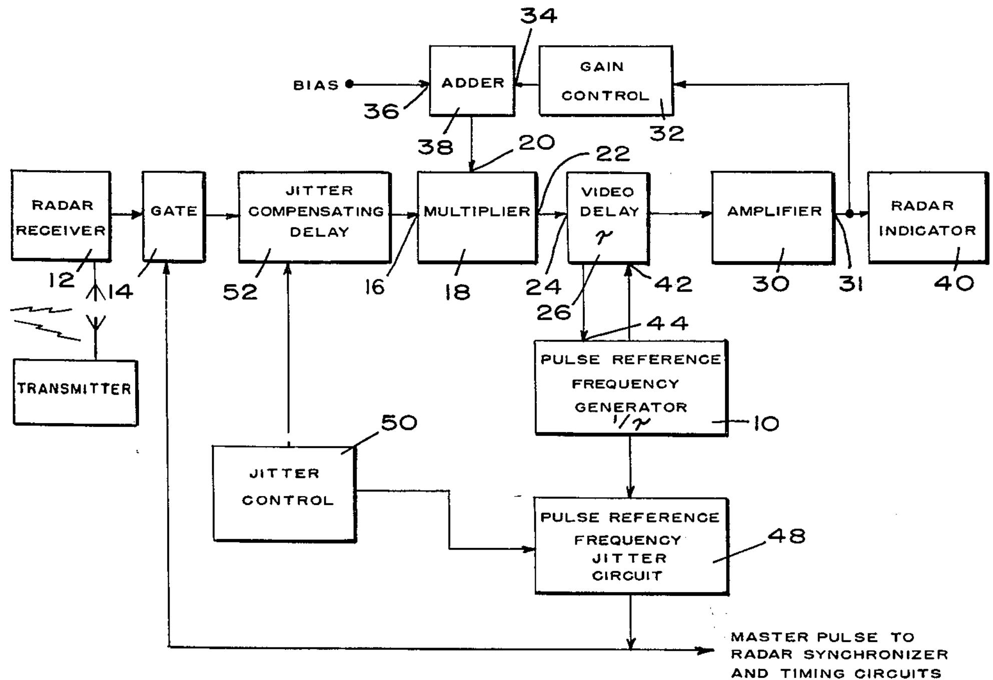
FIG. 2 is a block diagram of a circuit depicting the invention in a radar system whose output pulses are radiated at a variable rate.

The circuit of FIG. 2 is similar to that of FIG. 1 but illustrates the invention as applied to a radar system in which the pulses transmitted by the radar transmitter are "jittered," or in other words, the interval between successive transmitted pulses is varied at random so as to avoid any approach to a regularly occurring signal. This may be accomplished by applying the regularly recurring pulses from pulse generator 10 to a pulse reference frequency jitter circuit or controllable variable delay line 48, and the thus variably displaced pulses fed to the transmitter from the output of the variable delay line. A control device 50 such as is well known in the art is provided for varying the time delay of the variable delay line 48. Since the delay device 26 like that of FIG. 1 has a time delay equal to the constant interval between the regularly recurring pulses produced by the generator 10, a variable delay compensating device 52 is provided, the input of which is coupled to the receiver 12 through the gate 14 and the output of which is coupled to the input terminal 16 of the multiplier circuit 18. When the control device 50 adjusts the variable delay line to delay a pulse from generator 10 to the transmitter by a time $\Delta t$, the compensating variable delay line is simultaneously adjusted so that its time delay is $t-\Delta t$, $t$ being the time interval between the pulses from the generator 10. The target echo pulse then applied to the input of the compensating device 52 from the receiver 12 will arrive at the input terminal 16 of multiplier circuit 18 at an interval of time $t$ after it would have arrived were no variable delay and compensating delay lines used. If a succeeding pulse from the generator 10 is delayed by an amount $\Delta 3t$ due to adjustment of the delay line by the control 50, the compensating variable delay line 52 is automatically adjusted by the control 50 to have a delay time $t-\Delta 3t$ so that the following signal pulse will appear at the input 16 of the multiplier circuit 18 at a time $t$ after the preceding signal pulse which now appears at the other input terminal 20 of the multiplier circuit, the preceding signal pulse having been delayed by a time $t$ in the delay device 26, amplified in the amplifier 30, and fed back to the terminal 20 of the multiplier circuit through the gain control device 32 and the adder 38 in the manner described with reference to FIG. 1.

While the circuits of FIGS. 1 and 2 have been described in connection with a radar system, the teaching herein disclosed may well be adapted to other systems utilizing pulse signals such as in television receivers, in order to obtain an improved signal-to-noise ratio of the synchronizing pulses received from the transmitter to prevent noise signals from initiating the line and frame control pulses at the wrong time.

Whereas the invention has been described with reference to only two circuits for purposes of illustration, they are not to be construed as limiting the invention beyond the scope of the appended claims.

I claim:

1. In a system having means for receiving signals including spaced discrete pulses and intervening undesired noise signals and providing electrical output signals having values representative of the received signals, means for reducing the noise signals comprising multiplying means coupled to the output of the receiving means, signal delay means coupled to the output of said multiplying means, gain control means and a utilization device coupled to the output of said delay means, and a biasing means, said gain control means and biasing means being coupled to an input of said multiplying means.

2. In a system having a utilization device and means for receiving signals including spaced discrete pulses and intervening undesired noise signals and providing electrical output signals having values representative of the received signals, means for reducing the noise signals comprising a multiplier circuit, a delay device having a predetermined delay time coupled to the multiplier circuit output, means for controlling the gain of and biasing signals from the output of the delay device and applying the same to the input of the mulitplier circuit simultaneously with the succeeding output signals from the receiver, and means for applying the output of said delay means to said gain control means and to said utilization device.

3. In a pulse receiving system, a multiplier circuit having an output for providing the product of two signals, said multiplier circuit having an input to which said signals are simultaneously applied, means for applying the first of said signals including received pulses to the input of the multiplier circuit at a predetermined repetition rate, delay, gain control and biasing means connected between said multiplier output and input producing a modified second signal and simultaneously applying the second of said signals to the input of the multiplier including the received pulses at the predetermined repetition rate but delayed in time equal to the interval between the pulses of the first signals and means coupled to the output of the multiplier circuit for utilizing the pulses.

4. In a pulse receiving system, a multiplier circuit for providing the product of two signals, said multiplier circuit having an input to which said signals are simultaneously applied, means for applying the first of said signals including received pulses to the input of the multiplier circuit at a predetermined repetition rate, delay, gain control and biasing means connected between said multiplier output and input producing a modified second signal and simultaneously applying the second of said signals to the input of the multiplier including the product from the output of the multiplier circuit but delayed in time by said delay means for the interval between the pulses of the first signals, and means coupled to the output of the multiplier circuit for utilizing the pulses.

5. In a pulse receiving system, a multiplier circuit for providing the product of two signals, said multiplier circuit having an input to which said signals are simultaneously applied, means for applying first signals including received pulses to the input of the multiplier circuit at a predetermined repetition rate, a signal delay device having a time delay equal to the interval between the pulses of the first applied signals coupled to the output of the multiplier circuit and providing delayed output signals, gain control and biasing means connected between said delay device and input producing modified delayed signals and applying the delayed modified output signals from the delay device to the input of the multiplier circuit as a second signal to be multiplied with the first signals and means coupled to the output of the delay device for utilizing the multiplied signals.

6. In a radar system having means for generating pulses of short duration at a predetermined repetition rate, means for transmitting said pulses and means operative between transmitted pulses for receiving the pulses as target echo signals, a multiplier circuit for providing the product of two signals, said multiplier circuit having an input to which said signals are simultaneously applied, means for applying first signals including received pulses to the input of the multiplier circuit at a predetermined repetition rate, a signal delay device having a time delay equal to the interval between the pulses of the first applied signals coupled to the output of the multiplier circuit and providing delayed output signals, gain control and biasing means connected between said delay device and input producing modified delayed signals and applying the delayed modified output signals from the delay device to the input of the multiplier circuit as a second signal to be multiplied with the first signals and means coupled to the output of the delay device for utilizing the multiplied signals, means responsive to the generated pulses for rendering the multiplier circuit inoperative for the duration of a pulse and means coupling the generator to the delay device to apply pulses from the generator to the input of the delay device and to apply synchronizing pulses from the output of the delay device to the generator.

7. In a radar system having means for generating pulses of short duration at a predetermined repetition rate, means for transmitting the generated pulses, means for receiving said transmitted pulses as target echo signals, a multiplier circuit having an output for providing the product of two signals, said multiplier circuit having an input to which said signals are simultaneously applied, means for applying first signals including the received pulses to the input of the multiplier circuit at a predetermined repetition rate, a circuit connected between said input and output including gain control means, biasing means and a signal delay device having a time delay equal to the interval between generated pulses for receiving output signals from the multiplier circuit and for feeding delayed modified signals from its output as second signals to the input of the multiplier circuit to be multiplied with the first signals and means coupled to the output of the delay device for providing an indication of the multiplied signals.

8. In a radar system having means for generating pulses of short duration at a predetermined repetition rate, means for transmitting the pulses with variable intervals between successive pulses, means for receiving said transmitted pulses as target echo signals, a multiplier circuit having an output for providing the product of two signals, said multiplier circuit having an input to which said signals are simultaneously applied, means for applying first signals including the received pulses to the input of the multiplier circuit at the predetermined repetition rate, a circuit connected between said input and output including gain control means, biasing means and a signal delay device having a time delay equal to the interval between generated pulses for receiving output signals from the multiplier circuit and for feeding delayed modified signals from its output as second signals to the input of the multiplier circuit to be multiplied with the first signals and means coupled to the output of the delay device for providing an indication of the multiplied signals.

9. A radar system having means for generating pulses of short duration at a predetermined repetition rate, a transmitter, a first variable delay means for applying the generated pulses to the transmitter, means for receiving said transmitted pulses as target echo signals, a multiplier circuit having an output for providing the product of two signals, said multiplier circuit having an input to which said signals are simultaneously applied, a second variable delay means for applying first signals including the received pulses to the input of the multiplier circuit, a circuit connected between said input and output including gain control means, biasing means and a signal delay device having a time delay equal to the interval between the generated pulses for receiving output signals from the multiplier circuit and providing delayed modified signals from its output as second signals to the input of the multiplier circuit to be multiplied with the first signals, means for controlling the first variable delay means to vary the interval between succeeding pulses applied to the transmitter and for controlling the second variable delay means for applying the pulses of the first signal to the multiplier input circuit at the predetermined repetition rate, and means coupled to the output of the delay device for providing an indication of the multiplied signals.

10. A radar system comprising a multiplier circuit having an input connected to a source of pulse signals of predetermined interval and to the output of a delay circuit, said multiplier circuit having an output connected to the input of said delay circuit, said delay circuit including delay, gain control, and biasing means and providing modified signals having a time delay equal to said interval, and a signal utilizing device having an input connected to the output of said delay means and receiving the product of a plurality of said modified and pulse signals.

11. A radar system comprising a multiplier circuit having an input connected to a source of spaced discrete pulse signals and to the output of a delay circuit, said multiplier circuit having an output connected to the input of said delay circuit, said delay circuit including delay, gain control, and biasing means and providing modified signals having a time delay corresponding to the spacing of said pulse signals, and a signal utilizing device having an input connected to the output of said delay means and receiving the product of a plurality of said modified and pulse signals.

References Cited in the file of this patent

UNITED STATES PATENTS 2,908,812 Laurent ---------------- Oct. 13, 1959